| United States Patent [19] | [11] | 4,271,041 |
|---|---|---|
| Boudart et al. | [45] | Jun. 2, 1981 |

[54] HIGH SURFACE AREA MOLYBDENUM OXYCARBIDE CATALYSTS

[75] Inventors: Michel Boudart, Portola Valley, Calif.; Lucien E. Leclercq, Poitiers, France

[73] Assignee: The Board of Trustees of Leland Stanford Junior University, Stanford, Calif.

[21] Appl. No.: 938,822

[22] Filed: Feb. 8, 1979

[51] Int. Cl.$^3$ .................. B01J 21/18; B01J 27/24; C01B 31/00
[52] U.S. Cl. .................. 252/438; 208/143; 252/444; 252/445; 423/362; 423/415 R; 518/714
[58] Field of Search .................. 423/415 R; 252/438, 252/444, 445

[56] References Cited

PUBLICATIONS

*Science*, 181 (1973) 547, Boudart et al.
*Journal of Catalysis*, 48 (1977) 42, Ross et al.
*Journal of Catalysis*, 39 (1975) 298, Ross et al.
*Nature Physical Science*, 229 (1971) 27, Sinfelt et al.
*Japan Journal of Applied Physics*, 2 (1963) 702, Kimoto et al.
*Nature*, 202 (1964) 1327, Ferguson et al.

*Primary Examiner*—O. R. Vertiz
*Assistant Examiner*—Wayne A. Langel
*Attorney, Agent, or Firm*—Thomas E. Ciotti

[57] ABSTRACT

Novel, high specific surface area molybdenum oxycarbide catalysts are disclosed. They are prepared by the vapor condensation of molybdenum hexacarbonyl and catalyze the reaction of hydrogen and carbon monoxide to form hydrocarbons. Carburization of the molybdenum oxycarbides increases their activity in the carbon monoxide-hydrogen reaction.

16 Claims, No Drawings

HIGH SURFACE AREA MOLYBDENUM OXYCARBIDE CATALYSTS

BACKGROUND OF THE INVENTION

1. Field of the Invention

This invention relates to novel molybdenum oxycarbide catalysts, a method for making these new catalysts, and reactions employing these new catalysts.

2. Description of the Prior Art

*Nature,* 202 (1964) 1327, Ferguson et al, reports the preparation of a range of molybdenum oxycarbides by pyrolyzing molybdenum hexacarbonyl under a low pressure of hydrogen at 300° C. Chemical and structural analyses of these oxycarbides indicated they had a face centered cubic lattice, an atom ratio Mo:C of 1:0.28–0.34, and an atom ratio Mo:O of 1:0.31–0.46. No surface area analysis or use of these oxycarbides is reported.

In the catalysis art *Nature Physical Science,* 229 (1971) 27, Sinfelt et al, describes ethane hydrogenolysis using carbided molybdenum particles (surface area 12.4 and 12.7 m$^2$/g) made by reducing molybdenum dioxide with hydrogen and carbiding the reduced molybdenum with a mixture of ethane, hydrogen, and helium. The rate of ethane hydrogenolysis increased with the degree of carbiding of the catalyst.

In addition *Science,* 181 (1973) 547, Boudart et al states that the literature indicates that addition of carbon to nonnoble metals, such as molybdenum, confers to such metal some of the catalytic properties of the noble metals.

SUMMARY OF THE INVENTION

One aspect of the invention is molybdenum oxycarbides having a carbon content less than the stoichiometric carbon content of the compound Mo$_2$C, a specific surface area greater than about 20 m$^2$/g, and a face-centered cubic lattice.

Another aspect of the invention is a process for preparing such molybdenum oxycarbides by vaporizing molybdenum hexacarbonyl in a reducing atmosphere at low pressure, and condensing the vapors in a substantially nonoxidizing atmosphere at an elevated temperature and a low pressure.

Other aspects of the invention are carburized or nitrided derivatives of such molybdenum oxycarbides. Such surface treatment alters the catalytic activity of the oxycarbides.

Finally, the invention includes processes in which such oxycarbides and derivatives are employed as catalysts, particularly the preparation of hydrocarbons by reacting CO and H$_2$ in the presence of such oxycarbides or their carburized derivatives, and the preparation of ammonia by reacting nitrogen and hydrogen in the presence of nitrided derivatives of such oxycarbides.

DETAILED DESCRIPTION OF THE INVENTION

The new molybdenum oxycarbides are stable solids in the form of high specific surface area powders. They are interstitial compounds in which oxygen and carbon occupy interstitial sites in a complex arrangement. Their theoretical chemical formulas vary between those of Mo$_2$C and MoOC. They are carbondeficient relative to Mo$_2$C, having a C:Mo atom ratio less than that of Mo$_2$C or MoOC. More specifically they typically have a C:Mo atom ratio in the range of about 0.3:1 to about 0.4:1 and a O:Mo atom ratio in the range of about 0.5:1 to about 2:1. X-ray diffraction analysis indicates they have a face-centered cubic lattice structure.

An important property of these new alloys, in terms of their catalytic activity, is their high specific surface area. As measured by the BET method their specific surface area is at least about 20 m$^2$/g, and is usually in the range of about 20 to about 60 m$^2$/g. Such areas are indicative of particle sizes roughly in the vicinity of 100 A° surface area average diameter. Crystallite size determinations made by the X-ray diffraction line broadening method and electron microscopy evaluation give crystallite sizes from ½ height peaks ranging between about 60 A° and about 140 A°.

As indicated previously these new high specific surface area molybdenum oxycarbides are synthesized from molybdenum hexacarbonyl by vapor condensation using a reactive rather than an inert gas (also called gas evaporation). Vapor condensation synthesis methods are generally described by A. H. Phund, *J. Opt Soc Amer,* 23 (1933) 375, and by Kimoto et al, *Japan J Applied Physics,* 2 (1963) 702. As applied in the present invention the method involves (1) vaporizing molybdenum hexacarbonyl in a reducing atmosphere at low pressure, (2) reacting the product of (1) with the reactive gas of the reducing atmosphere at high temperature and low pressure, and (3) condensing the vapors in a nonoxidizing atmosphere, preferably at ambient (room) temperature. In the vaporization step the reducing atmosphere permits the hexacarbonyl to decompose without extensive formation of graphitic carbon. Reducing gases such as hydrogen, carbon monoxide, and mixtures thereof may be used as the reactive gas. Inert gases such as neon, argon, and xenon may be mixed with such gases. The pressures of the reactive gases as well as the temperature of the vaporization of molybdenum hexacarbonyl and the temperature of its decomposition (sprial tungsten filament temperature) affect the specific surface area of the molybdenum oxycarbide product. Oxycarbides having the required surface area are formed at pressures in the range of 20 to 100 Torr and reaction temperatures in the range of 1373° K. to 2073° K. A preferred temperature range is 1773° K. to 2073° K. The condensation may be carried out in the same gases as are used in the vaporization. In this regard it is believed that the molecular weight of the gas also affects the surface area of the molybdenum oxycarbide, with surface area increasing as the molecular weight of the gas decreases.

Table 1 below reports the preparation and characterization of examplary oxycarbides of the invention. These oxycarbides were made by vaporizing molybdenum hexacarbonyl (obtained from Ventron Corp, Danvers, Mass., FW=269, Mo=36.3%, C=27.2%, d=1.96, decomposition without melting at 150° C., bp 156.4° C. @ 766 Torr) into the indicated gas(es) at the indicated pressure and temperature in a resistance heated baffle box and passing the resulting vapors in the ambient gas(es) over a spiral tungsten filament at the indicated temperature.

TABLE 1

| Example No. | Gas Composition Pressure (Torr) Ar | H₂ | CO | Baff. Box T °K. | W Fil. T °K. | Atom Ratio C:Mo:O | X-ray Crystallite Size (A) | BET Surface Area m²/g |
|---|---|---|---|---|---|---|---|---|
| 1 | 0 | 20 | 0 | 573 | 1373 | 0.40:1:2 | 60 | — |
| 2 | 20 | 20 | 0 | 572 | 1373 | 0.33:1:1.8 | 72 | — |
| 3 | 0 | 10 | 0 | 773 | 1373 | 0.32:1:1.7 | 86 | 42 |
| 4 | 0 | 10 | 0 | 773 | 1373* | 0.31:1:1.1 | 90 | 59 |
| 5 | 0 | 150 | 0 | 873 | 2073 | 0.35:1:1.1 | 70 | — |
| 6 | 50 | 45 | 0 | 873 | 2073 | 0.31:1:0.5 | 68 | — |
| 7 | 50 | 0 | 50 | 873 | 1773 | 0.33:1:0.6 | 130 | — |
| 8 | 20 | 0 | 80 | 873 | 2073 | 0.35:1:1.7 | 140 | 20 |

*Change of the shape of the tungsten filament.

CO chemisorption measurements were made on the molybdenum oxycarbides of Examples 3, 4, 6, 7, and 8 reported in Table 1. These measurements indicate the number of active sites on the surface of the alloys. They were performed with a conventional glass constant volume adsorption system provided with a quartz spiral Bourdon gauge. Before being measured the alloys were heated in hydrogen at 623° K. for 2 hr and then evacuated at 623° K. for at least another 2 hr. CO adsorption isotherms were measured at room temperature between $5.3 \times 10^3$ Pa and $4.3 \times 10^4$ Pa. The linear portion of the isotherm was extrapolated to zero pressure to obtain the amounts of CO chemisorption indicated in Table 2 below. These same molybdenum oxycarbides (after hydrogen treatment as described above) were used as catalysts in the methanation reaction of carbon monoxide and hydrogen at the conditions indicated in Table 2. Reaction rates were measured in a differential batch recycle reactor. The products were analyzed quantitatively with a chromatograph. Activities of the oxycarbides were determined using the reported CO chemisorption values. These activities are also reported in Table 2 as specific rates expressed as turnover frequency (N), ie molecules of methane formed per one surface active site per second. It is estimated that about 10% of the surface area of the catalyst is active.

CO chemisorption and BET surface area measurements were made on the oxycarbides after the methanation reaction tests. These measurements are also reported in Table 2.

TABLE 2

| Example No. | CO Chemisorption Micromol g⁻¹ New | Used | BET Sur. Area m² g⁻¹ New | Used | Methanation Conditions PT (Torr) | $P_{H2}/P_{CO}$ | T °K. | CH₄ Formation N × 10³ S⁻¹ |
|---|---|---|---|---|---|---|---|---|
| 3 | 31.7 | 21.7 | 42 | 36.5 | 760 | 3 | 573 | 38.5 |
| 4 | 39 | 12.6 | 59 | 33 | 760 | 3 | 573 | 22.5 |
| 6&7 |  | 13.3 |  | 18 | 760 | 3 | 573 | 24 |
| 8 | 25 | 15.2 | 20 |  | 760 | 3 | 571.5 | 41.5 |

The activity of the oxycarbides for hydrocarbon synthesis from carbon monoxide and hydrogen may be increased by carburizing them with a carburizing agent in either gas or liquid form, preferably gas, that is capable of generating nascent carbon. Such gaseous agents include mixtures of CO and H₂ (which form hydrocarbons in situ) and hydrocarbons such as the $C_1$ to $C_6$ alkanes with or without H₂ admixed. The carburization temperature will be the temperature at which the agent forms the nascent carbon. For the above specified agents the carburizing temperature will usually be in the range of about 600° K. to about 900° K.

The effect of carburization of the activity of the oxycarbides was exemplified by subjecting the oxycarbide of Example No. 4 to two different carburization treatments and using the carburized materials as catalysts in the methanation reaction of CO and H₂. One of the carburization treatments consisted of recycling a mixture of hydrogen and CO, $P_{H2}/P_{CO}=3$, over the oxycarbide at 760 Torr, 776° K. for 2 hr. The other treatment consisted of recyling a mixture of n-butane and hydrogen, $P_{H2}/P_{C4}=9$, over the oxycarbide at 760 Torr, 776° K. until only methane and hydrogen were left in the gas phase (about 3 hr). BET surface area, CO chemisorption, and turnover frequencies for methane and total hydrocarbon formation were measured and calculated for both materials by the techniques described above. The results, together with the reaction conditions, are reported in Table 3 below. Published data on the activity of ruthenium catalysts are also reported in Table 3 for comparison purposes.

TABLE 3

| Catalysts | BET Surface Area m² g⁻¹ | CO Uptake micromol g⁻¹ | Experimental Conditions of CO + H₂ Reaction Total Pressure (Torr) | $P_{H2}/P_{CO}$ | Temperature °K. | Turnover Frequency (N) Methanation × 10³ S⁻¹ | Hydrocarbon formation × 10³ S⁻¹ | References |
|---|---|---|---|---|---|---|---|---|
| Example 4 after C₄/H₂ carburization | 31.5 | 33 | 760 | 3 | 578 | 186 | 221 |  |
| Example 4 after CO/H₂ carburization | 34.6 | 40 35 (new) | 760 | 0.6 | 574.5 | 39.3 | 59 |  |
| 5% Ru/Al₂O₃ 0.5% to 5% | — | 28.5 (used) | 760 | 3 | 548 | 181 | — | (1) |

TABLE 3-continued

| Catalysts | BET Surface Area $m^2 g^{-1}$ | CO Uptake micromol $g^{-1}$ | Experimental Conditions of CO + $H_2$ Reaction | | | Turnover Frequency (N) | | References |
|---|---|---|---|---|---|---|---|---|
| | | | Total Pressure (Torr) | $\frac{P_{H_2}}{P_{CO}}$ | Temperature °K. | Methanation × $10^3 S^{-1}$ | Hydrocarbon formation × $10^3 S^{-1}$ | |
| Ru/Al$_2$O$_3$ | — | — | 750 | 3 | 553 | 25.4 | 49.3 | (2) |
| 1% Ru/SiO$_2$ | — | 20.4 (used) 68 (new) | 80 | 3 | 600 | 57.3 | — | (3) |
| 1$ Ru/SiO$_2$ | — | 12 (used) | 760 | 3 | 548 | 230 | 270 | (4) |

(1) J Catalysis, 37 (1975) 449, Vannice
(2) J Catalysis, 35 (1974) 54, Dalla Betta et al
(3) J Catalysis, 65 (1976) 128, Bond et al
(4) J Catalysis, 50 (1977) 228, Vannice The products of the reaction of carbon monoxide and hydrogen using the carburized oxycarbides were analyzed by standard techniques to determine the selectivity of the catalyst. The analyses are reported in Table 4 below.

TABLE 4

| Catalysts | Experimental Conditions | | | Hydrocarbon Distribution mol % | | | | |
|---|---|---|---|---|---|---|---|---|
| | Total Pressure (Torr) | $\frac{P_{H_2}}{P_{CO}}$ | T°K. | $C_1$ | C=C | $C_2$ | $C_3$ | $C_nH_{2n}$ n > 3 |
| Example 4 | 760 | 3 | 571.5 | 78.3 | 0.5 | 14.7 | 3.9 | 2.6 |
| Example 4 after C$_4$/H$_2$ Carburization | 760 | 3 | 578 | 83.8 | 0.05 | 9.3 | 6.15 | 0.7 |
| Example 4 after CO/H$_2$ Carburization | 760 750 | 0.6 3 | 574.5 564 | 66.3 82.1 | 0.4 0.6 | 24.5 12.6 | 8.6 4.2 | 0.2 0.5 |

In addition to the carbon monoxide-hydrogen reaction, the oxycarbides and carburized derivatives thereof may be useful as heterogeneous catalysts in various reactions involving the formation or destruction of hydrogen-hydrogen bonds, carbon-hydrogen bonds, carbon-carbon bonds, and carbon-oxygen bonds. Such reactions include: the hydrogenation of unsaturated acyclic and cyclic hydrocarbons such as alkenes, alkynes, cycloalkenes, and monocyclic and fused ring aromatic hydrocarbons including the hydrogenation of vegetable oils and the hydrogenation of donor solvents, such as naphthalene, in the liquification of coal; hydroforming; the hydrogenolysis of hydrocarbons; and the isomerization of hydrocarbons such as the isomerization of n-alkanes to isoalkanes.

The oxycarbides may also be subjected to other surface treatments such as carbonitriding, nitriding, boriding, or phosphiding to alter their catalytic behavior. For instance, carbonitriding and nitriding affect the activity of the oxycarbides for the reaction of nitrogen and hydrogen to form ammonia. Such derivatives may also be useful in catalyzing the formation of other reactions requiring the formation and/or destruction of nitrogen-hydrogen bonds and/or nitrogen-carbon bonds.

Modifications of the oxycarbides, surface-treated derivatives thereof, methods for making such oxycarbides and derivatives, and reactions employing such oxycarbides and derivatives as catalysts that are substantially equivalent in composition, function, or procedure, as the case may be, to the oxycarbides, derivatives, methods, and reactions described above are intended to be within the scope of the following claims.

We claim:

1. The product prepared by carburizing molybdenum oxycarbide having a carbon content less than the stoichiometric carbon content of the compound Mo$_2$C, a specific surface area greater than about 20 m$^2$/g, and a face-centered cubic lattice.

2. The product of claim 1 wherein the carburizing agent is a hydrocarbon.

3. The product of claim 2 wherein the carburizing agent is n-butane.

4. The product of claims 2 or 3 wherein the carburization is carried out at 600° K. to 900° K.

5. The product of claim 2 wherein the hydrocarbon is an alkane of 1 to 6 carbon atoms.

6. The product of claim 1 wherein the carburizing agent is H$_2$ and CO.

7. The product of claim 6 wherein the carburization is carried out at 600° K. to 900° K.

8. The product prepared by nitriding molybdenum oxycarbide having a carbon content less than the stoichiometric carbon content of the compound Mo$_2$C, a specific surface area greater than about 20 m$^2$/g, and a face-centered cubic lattice.

9. Process for altering the catalytic activity of molybdenum oxycarbide having a carbon content less than the stoichiometric carbon content of the compound Mo$_2$C, a specific surface area greater than about 20 m$^2$/g, and a face-centered cubic lattice comprising carburizing said molybdenum oxycarbide.

10. The process of claim 9 wherein the carburizing agent is H$_2$ and CO or a hydrocarbon.

11. The process of claims 9 or 10 wherein the carburization is carried out at 600° K. to 900° K.

12. The process of claim 13 wherein step (b) is carried out at a temperature in the range of 1773° K. to 2073° K.

13. Process for preparing a molybdenum oxycarbide of high specific surface area comprising:
(a) vaporizing molybdenum hexacarbonyl in a reducing atmosphere at low pressure,
(b) reacting the product of (a) with the reducing atmosphere at a temperature in the range of 1373°

K. to 2073° K. and a pressure in the range of 20 Torr to 100 Torr, and (c) condensing the vapors in a substantially nonoxidizing atmosphere.

14. The process of claim 13 wherein the reducing atmosphere is composed of hydrogen, carbon monoxide, or mixtures thereof.

15. The process of claim 14 wherein the reducing atmosphere also includes an inert gas.

16. The process of claim 13 wherein the reducing atmosphere and the substantially nonoxidizing atmosphere are composed of the same gas or mixture of gases.

* * * * *